(12) United States Patent  
Jackson et al.

(10) Patent No.: US 7,176,371 B1  
(45) Date of Patent: Feb. 13, 2007

(54) ALGORITHMIC COMBO-INSTRUMENT SLIDE RULER FOR MUSICAL REFERENCE

(75) Inventors: Robert Allen Jackson, Pahrump, NV (US); Joseph Algustine Jarvis, Pahrump, NV (US)

(73) Assignee: Keytomusic, Pahrump, NV (US)

( * ) Notice: Subject to any disclaimer, the term of this patent is extended or adjusted under 35 U.S.C. 154(b) by 0 days.

(21) Appl. No.: 11/308,525

(22) Filed: Apr. 1, 2006

(51) Int. Cl.  
*G09B 15/02* (2006.01)

(52) U.S. Cl. .............................. 84/471 SR; 84/470 R; 84/471 R; 84/471 SR; 84/473; 84/474; 84/481; 84/485 SR

(58) Field of Classification Search ............ 84/485 SR, 84/471 R, 473, 474, 481, 470 R, 471 SR  
See application file for complete search history.

(56) References Cited

U.S. PATENT DOCUMENTS

| | | | | |
|---|---|---|---|---|
| 1,300,193 A | * | 4/1919 | Raff | 84/485 R |
| 2,814,231 A | * | 11/1957 | Jones | 84/485 R |
| 3,668,967 A | * | 6/1972 | Malis | 84/471 R |
| 3,712,167 A | * | 1/1973 | Renault | 84/485 R |
| 3,748,947 A | * | 7/1973 | Freiheit | 84/485 R |
| 3,894,465 A | * | 7/1975 | Simmons | 84/485 R |
| 4,069,737 A | | 1/1978 | Anderson | 84/485 SR |
| 4,404,886 A | | 9/1983 | Leonard | 84/471 R |
| 4,537,111 A | * | 8/1985 | Heath | 84/473 |
| 4,602,550 A | * | 7/1986 | Dadi et al. | 84/473 |
| 4,969,383 A | | 11/1990 | Bezeau, Jr. | 84/485 SR |
| 5,029,507 A | * | 7/1991 | Bezeau, Jr. | 84/485 SR |
| 5,386,757 A | * | 2/1995 | Derrick | 84/473 |
| 5,597,969 A | | 1/1997 | Brauer | 84/473 |
| 5,644,096 A | * | 7/1997 | Bull | 84/485 SR |
| 5,866,832 A | * | 2/1999 | Solowiow | 84/485 R |
| 6,239,344 B1 | * | 5/2001 | Prevost | 84/471 R |
| 6,969,793 B2 | * | 11/2005 | Kerkhoff | 84/478 |
| 7,084,340 B2 | * | 8/2006 | Tan | 84/477 R |

* cited by examiner

*Primary Examiner*—Lincoln Donovan  
*Assistant Examiner*—Robert W. Horn  
(74) *Attorney, Agent, or Firm*—Robert Allen Jackson

(57) ABSTRACT

An algorithmic combo-instrument slide ruler comprising one common part working in cooperation with two interchangeable parts selected from separate multitudes of unique yet related parts. An opaque slidable combo-instrument tuning card is selected having thereon information resembling a stringed instrument, having fingering positions represented in equivalent keyboard keys laid out in a multi-tier octave isolating manner. A semi-opaque rectangular sleeve housing comprising of parent and dependant child windows arranged in a reticulated manner, working within stationary alignment with a selected semi-opaque scale or mode insert comprising of a scale or mode relevant predetermined array of finger position windows and dependant finger position data boxes, allows for a visible and semi-visible view of the combo-instrument card there through, showing available fingering positions through parent windows and music reference information through relevant child windows. By sliding combo-instrument card, music reference information pertaining to the selected scale or mode insert can be obtained in every key in selected tuning.

8 Claims, 10 Drawing Sheets

ALGORITHMIC COMBO-INSTRUMENT SLIDE RULER FOR MUSICAL REFERENCE

The present invention revolves around music. Music is an entity that has forever come with boundaries and has been limited to a set structure and theory. It is a goal of the inventor to create a means of applying basic music theory and structure to an application allowing students and professionals alike to be able to freely explore the depths and heights of music without any prior schooling or training whatsoever. There have been attempts to disclose the necessary information required to accomplish such tasks in the past. All of these past methods, devices, and teachings have fallen short of the true essence of music in its simplicity.

Most all western cultural music revolves around twelve tonal notes that make up the chromatic scale. These note names are (C, C sharp/D flat, D, D sharp/E flat, E, F, F sharp/G flat, G, G sharp/A flat, A, A sharp/B flat, B, C . . . etc.). On a piano the natural tonal notes are the white keys and the (accidental sharps/flats) are the black keys. Many other scale and mode types can be built from each of these twelve notes using what's called a step pattern. Every scale or mode type has its own predetermined step pattern derived from this twelve note system. Step patterns, also known as intervals are a division of the chromatic scale (½ step=1 tonal note advancement, full step=a 2 tonal note advancement, 1½ step=a 3 tonal note advancement, etc.). Some step patterns are identical to those of other scales or modes (e.g., Major scale/Ionian mode, Minor scale/Aeolian mode/Ethiopian scale, Melodic minor/Hawaiian scale, . . . ). There is also a step pattern numbering system used to label each of the steps in any given pattern. Each note in any given scale has a numerical value and is labeled accordingly to its divisional step in the pattern. The first note is labeled number 1, second note 2, third note 3, and so on up until the tonal note letter matches that again of number 1. The step pattern and numbering for the Major scale is as follows (1=starting full step, 2=full step, 3=½ step, 4=full step, 5=full step, 6=full step, 7=finishing ½ step, 1=next higher octave starting full step, etc.). An example of the C Major scale would be (1=C, 2=D, 3=E, 4=F, 5=G, 6=A, 7=B, 1=C, etc.). Whereas a D Major scale would be (1=D, 2=E, 3=F sharp, 4=G, 5=A, 6=B, 7=C sharp, 1=D, etc.). The Minor scale has a different step pattern (1=starting full step, 2=½ step, 3=full step, 4=full step, 5=½ step, 6=full step, 7=finishing full step, 1=next higher octave starting full step). An example of the C Minor scale would be (1=C, 2=D, 3=D sharp, 4=F, 5=G, 6=G sharp, 7=A sharp, 1=C). Variations in step patterns or the starting tonal letter note effect the overall tone and or key of a tune. The key of a tune is based upon a starting tonal letter and step pattern. Below is an example showing tonal note letter names and step pattern numberings for various scales and modes using a starting tonal letter note of C.

| Scale or Mode Name | Tonal Note Letter Names | Step Pattern Numbering |
|---|---|---|
| Major, Ionian. | C,D,E,F,G,A,B,C | 1x2x34x5x6x71 |
| Dorian. | C,D,D#,F,G,A,A#,C | 1x23x4x5x67x1 |
| Phrygian. | C,C#,D#,F,G,G#,A#,C | 12x3x4x56x7x1 |
| Lydian. | C,D,E,F#,G,A,B,C | 1x2x3x55x6x71 |
| Mixolydian. | C,D,E,F,G,A,A#,C | 1x2x34x5x67x1 |
| Aeolian, Ethiopian, minor Relative. | C,D,D#,F,G,G#,A#,C | 1x23x4x56x7x1 |
| Locrian. | C,C#,D#,F,F#,G#,A#,C | 12x3x45x6x7x1 |
| Kumoi, Hirajoshi, Iwato. | C,E,F,A,B,C | 1xxx34xxx6x71 |
| Mongolian, Pentatonic Major. | C,D,E,G,A,C | 1x2x3xx5x6xx1 |
| Whole, Tone per tone. | C,D,E,F#,G#,A#,C | 1x2x3x4x5x6x1 |
| Lydian b7, Overtone. | C,D,E,F#,G,A,A#,C | 1x2x3x55x67x1 |
| Ionian augmented, Jewish. | C,D,E,F,G#,A,B,C | 1x2x34xx66x71 |
| Hindu, m Aeolian Major. | C,D,E,F,G,G#,A#,C | 1x2x34x56x7x1 |
| Mohammedan, Locrian Major. | C,D,E,F,F#,G#,A#,C | 1x2x345x6x7x1 |
| Romanian minor, m Dorian #4. | C,D,D#,F#,G,A,A#,C | 1x23xx55x67x1 |
| Hungarian minor, Algerian. | C,D,D#,F#,G,G#,B,C | 1x23xx556xx71 |
| Melodic minor, Hawaiian. | C,D,D#,F,G,A,B,C | 1x23x4x5x6x71 |
| Harmonic minor, m Aeolian M7. | C,D,D#,F,G,G#,B,C | 1x23x4x56xx71 |
| Bebop minor, Hexatonic. | C,D,D#,E,F,G,A,A#,C | 1x2334x5x67x1 |
| Gipsy 1, Byzantine. | C,C#,E,F,G,G#,A#,C | 12xx34x56xx71 |
| Gipsy 2, Spanish, Phrygian Major. | C,C#,E,F,G,G#,B,C | 12xx34x56x7x1 |
| Super Locrian, m Altered dominant. | C,C#,D#,E,F#,G#,A#,C | 12x33x5x6x7x1 |
| Symetric, dominant. | C,C#,D#,E,F#,G,A,A#,C | 12x33x55x67x1 |
| Blues 1. | C,D#,F,F#,G,A#,C | 1xx3x455xx7x1 |
| Blues 2. | C,D#,F,F#,G,A#,B,C | 1xx3x455xx771 |
| Blues 3. | C,D#,E,F,F#,G,A#,B,C | 1xx33455x771 |
| Blues 4. | C,D#,E,F,F#,G,A,A#,B,C | 1xx33455x6771 |
| Chinese 1. | C,D,F,G,A,C | 1x2x4x5x6xx1 |
| Chinese 2. | C,E,F#,G,B,C | 1xxx3x55xxx71 |
| Bebop dominant. | C,D,E,F,G,A,A#,B,C | 1x2x34x5x6771 |
| Bebop ½ diminished. | C,C#,D#,F,F#,G,G#,B,C | 12x3x4556xx71 |
| Lydian augmented. | C,D,E,F#,G#,A,B,C | 1x2x3x5x66x71 |
| Lydian #9. | C,D#,E,F#,G,A,B,C | 1xx33x55x6x71 |
| Locrian 2. | C,D,D#,F,F#,G#,A#,C | 1x23x45x6x7x1 |
| Locrian 6. | C,C#,D#,F,F#,A,A#,C | 12x3x45xx67x1 |
| Locrian minor. | C,D,E,F#,G,G#,A#,C | 1x2x3x556x7x1 |
| Hungarian Major. | C,D#,E,F#,G,A,A#,C | 1xx33x556xx71 |
| Hungarian gipsy. | C,D,D#,F#,G,G#,A#,C | 1x23xx556x7x1 |
| Harmonic Major. | C,D,E,F,G,G#,B,C | 1x2x34x56xx71 |
| Harmonic double. | C,C#,E,F,G,G#,B,C | 12xx34x56x7x1 |
| Javanese. | C,C#,D#,F,G,A#,C | 12x3x4x5xx7x1 |
| Japanese. | C,C#,F,G,G#,C | 12xxx4x56xxx1 |
| Neopolitan minor. | C,C#,D#,F,G,G#,B,C | 12x3x4x56xx71 |
| Neopolitan Major. | C,C#,D#,F,G,A,B,C | 12x3x4x5x6x71 |

-continued

| Scale or Mode Name | Tonal Note Letter Names | Step Pattern Numbering |
|---|---|---|
| m altered. | C,C#,D#,E,F#,G#,A,C | 12x33x5x66xx1 |
| m Dorian b2. | C,C#,D#,F,G,A,A#,C | 12x3x4x5x67x1 |
| augmented. | C,D#,E,G,G#,B,C | 1xx33xx56xx71 |
| Balinese. | C,C#,D#,G,G#,C | 12x3xxx56xxx1 |
| Chromatic. | C,C#,D,D#,E,F,F#,G,G#,A,A#,B,C | 1223345566771 |
| Oriental. | C,C#,E,F,F#,A,A#,C | 12xx345xx67x1 |
| Pentatonic minor. | C,D#,F,G,A#,C | 1xx3x4x5xx7x1 |
| Pentatonic dominant. | C,D,E,G,A#,C | 1x2x3xx5xx7x1 |
| Flamenco. | C,C#,D#,E,F,G,G#,A#,C | 12x334x56x7x1 |
| Persian. | C,C#,D#,F,F#,G#,B,C | 12x3x45x6xx71 |
| Spanish 8 tone. | C,C#,D#,E,F,F#,G#,A#,C | 12x3345x6x7x1 |
| diminished. | C,D,D#,F,F#,G#,A,B,C | 1x23x45x66x71 |
| Egyptian. | C,D,F,G,A#,C | 1x2xx4x5xx7x1 |
| Enigmatic. | C,C#,E,F#,G#,A#,B,C | 12xx3x5x6x771 |
| Pelog. | C,C#,D#,G,A#,C | 12x3xxx5xx7x1 |

A Melody is an arranged succession of musical tones of given pitches and durations. The musical tones or tonal notes in a melody are almost always limited to those of the selected key. An example of a melody using the step pattern numbering system could look like (1, 3, 3, 7, 5, 6, 5). This arrangement used in the key of C Major will look like (C, E, E, B, G, A, G).

A chord is constructed using three or more musical tones, having its tones sounded simultaneously. Triads are the simplest and most common form of chords having only three tonal notes in their structure. Triads are constructed by starting on any tonal note in a given key, and then stacking every other tonal note step. These triads are usually limited to the availability of only those tonal notes in a given key. A triad at the starting position of the C Major scale is called a C Major chord. A C Major chord has the step pattern numbers and tonal letter notes (1=C, 3=E, 5=G). There is a chord numbering system using Roman numerals which labels chord positions according to their step pattern number. A chord built on the starting step pattern number 1 will be chord (I). A triad at the second position of C Major is limited in its availability of tonal notes (2=D, 4=F, 6=A), creating a D minor triad and is labeled chord (ii). Upper case Roman numeral (I, IV, V) refer to Major quality chords while lower case Roman numerals (ii, iii, vi, vii) refer to Minor quality chords. Lower case Roman numerals followed by a small circle (viio) stand for diminished quality chords.

More and more music students are taking their signature music styles to new and greater bounds. The use of alternate instrument tunings is a technique used by some musicians, allowing more diverse access to musical arrangements otherwise physically impossible. Below is an example of some alternate tunings and their tonal note values, starting from the lowest pitch string and ending with the highest pitch string.

| Stringed instrument tuning | String tonal note values |
|---|---|
| Standard guitar | E,A,D,G,B,E |
| ½ tone drop guitar | D#,G#,C#,F#,A#,D# |
| Drop D guitar | D,A,D,G,B,E |
| Drop A guitar | E,A,E,A,C#,E |
| Open C guitar | C,G,C,G,C,E |

-continued

| Stringed instrument tuning | String tonal note values |
|---|---|
| Open C minor guitar | C,G,C,G,C,D# |
| Open D guitar | D,A,D,F#,A,D |
| Open D minor guitar | D,A,D,F,A,D |
| Open D sus4 guitar | D,A,D,G,A,D |
| Open E guitar | E,B,E,G#,B,E |
| Open E minor guitar | E,B,E,G,B,E |
| Open E sus11 guitar | E,A,E,G,B,E |
| Open F guitar | C,F,C,F,A,C |
| Open G guitar | D,G,D,G,B,D |
| 7 String guitar | B,E,A,D,G,B,E |
| 7 String guitar 1 tone | A,D,G,C,F,A,D |
| Standard Bass | E,A,D,G |
| Drop D Bass | D,A,D,G |
| 5 String Bass | B,E,A,D,G |
| 6 String Bass | B,E,A,D,G,B |
| Open C Banjo | G,C,G,B,D |
| Open D Banjo | G,D,G,B,D |
| Mandolin | G,D,A,E |
| Resophonic guitar | G,B,D,G,B,D |

DESCRIPTION OF PRIOR ART AND BACKGROUND OF THE INVENTION

U.S. Pat. No. 4,069,737 to J. O. Anderson, Jan. 26, 1976, disclosed is a handheld apparatus representative of a guitar slide rule consisting of only two parts and is complex in nature. A slider allows for changing only between major and minor keys.

U.S. Pat. No. 4,404,886 to V. M. Leonard, Sep. 20, 1983, shows a note reading octave isolator for a keyboard instrument, lacking aid to a multi-stringed instrument.

U.S. Pat. No. 4,537,111 to J. R. Heath, Aug. 19, 1983, disclosed is a note transposer for guitars and other instruments having a plurity of independent slides in a frame holding them parallel; each slider represents a separate string of an instrument.

U.S. Pat. No. 4,969,383 to R. A. Bezeau, Jr., Nov. 13, 1990, discloses a musical scale indicator composed of two cooperating parts. A base is provided having thereon printed information pertaining to a musical instrument and fingering positions. A slidable, clear overlay is slidably connected with the base. The overlay has printed thereon the letter designations for musical tones. The embodiment of a stringed instrument is limited to only the Aeolian, Locrian, Ionian, Dorian, Phrygian, Lydian, and Mixolydian scales and lacks the ability to accommodate alternate instrument tunings. The embodiment of a keyboard is limited to the same seven scales and fails to show the direct relations of the keyboard and stringed instrument.

U.S. Pat. No. 5,029,507 to R. A. Bezeau, Jr., Jul. 9, 1991, shows a chord progression finder relative to U.S. Pat. No. 4,969,383 and is similar in nature showing chord progressions instead of scale progressions.

U.S. Pat. No. 5,386,757 to D. Derrick, Feb. 7, 1995, discloses a musical scale, scale pattern, and chord indicator with a simulated finger board positioned within a display window on housing. Having the graphics on the cover limits the indicator in accommodating alternate tunings. There is no embodiment to accommodate a musical keyboard.

U.S. Pat. No. 5,597,969 to K. K. M. Brauer, Jan. 28, 1997, discloses a music slide ruler reference device and system, comprising of two cooperating parts. First a flattened sleeve having apertures and music data printed thereon for displaying cooperative music data on a second sliding insert.

U.S. Pat. No. 5,644,096 to G. N. Bull, Jul. 1, 1997, discloses a musical computational device comprising of atleast two elements whose positions relative to each other are alterable. Thou providing information for music notation, a keyboard, and a stringed instrument, it is complex and fails to show the direct tonal note relations between the two instruments. Further, having instrument graphics and tonal note letters on the cover tremendously limits the apparatus in regards to alternate instrument tunings.

While each of the prior art devices might help a music student in learning music theory and some will aid them in learning different fingering positions on their instrument, they are complex and limited in nature. What is needed is a freestanding instructional device that is informative, versatile, upgradeable, and visually simple allowing for real-time play. Further, none of the prior art devices have an embodiment that accommodates the ever growing use of non-standard instrument tunings. Even further, none of the prior art devices show the direct tonal relationships of a keyboard and stringed instruments equivalent finger positions. More and more electronic musical instruments are being developed that are tonally arranged as a multi-stringed instrument, having push buttons which are designed to be played as a keyboard.

BRIEF SUMMARY OF THE INVENTION

An algorithmic combo-instrument slide ruler for musical reference comprising of slidable combo-instrument tuning cards of thin opaque sheet materials, A rectangular sleeve housing of a thin semi-opaque transparent material having openings at either end, and a multitude of interchangeable scale and mode inserts of thin semi-opaque transparent material. A scale or mode insert is selected and placed in front of a relative slidable combo-instrument tuning card, while the remaining scale and mode inserts and tuning cards are replaced behind it. The entire stack is then slid through an opening at the left side of the rectangular sleeve housing until becoming flush with the opening at its right side leaving only the oversized slidable combo-instrument tuning card protruding from sleeve housings left side providing substantially all music information related to selected scale or mode insert to include natural and artificial chords, scales, intervals, and inversions of intervals. Sliding slidable combo-instrument tuning card left to the next available alignment raises the key of the scale to the next available note allowing for transposing. The algorithmic combo-instrument slide ruler in its first embodiment comprises of a sleeve housing, sliding stand members, twenty eight scale and mode insert types, two slidable combo-instrument tuning cards, and will be able to be upgraded to over a hundred scale insert types for each of the twenty possible instrument alternate tunings to cover all music styles and cultures.

BRIEF DESCRIPTION OF THE DRAWINGS

Reference Numerals in Drawings
31 rectangular sleeve housing
33 parent window
35 dependant child window
37 scale or mode name window
41 scale or mode insert
43 finger position window
45 dependant finger position data box
47 scale or mode name box
51 slidable combo-instrument tuning card
52 tuning mechanism
53 nut
54 string
55 white backdrop for dependant finger position data box
56 fret
57 fingering position
58 piano key
59 musical note letter value
60 stored multitude of cards and inserts
70 slidable stand members

DETAILED DESCRIPTION OF THE INVENTION

Figure 1:
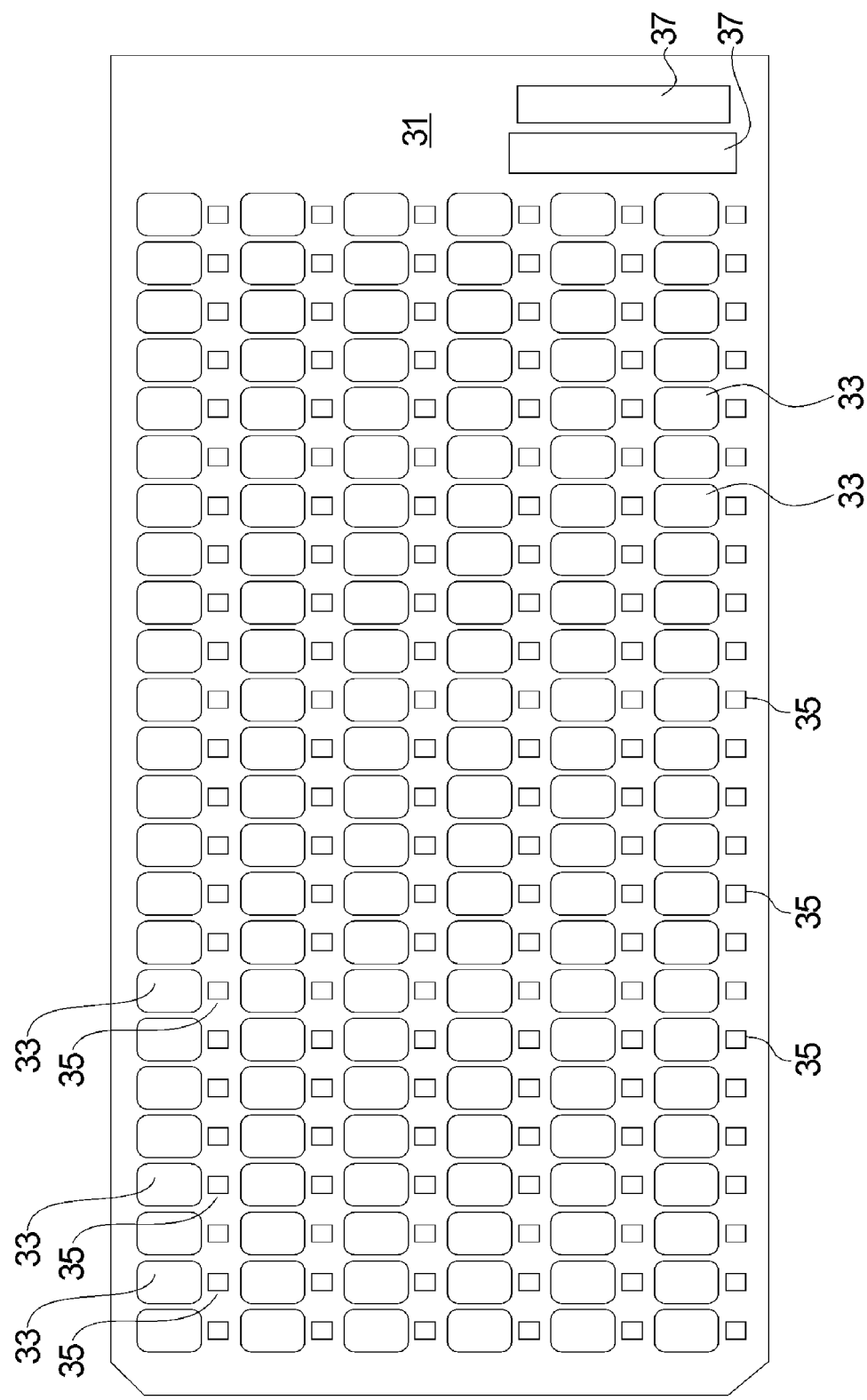
FIG. 1: is a plan view of the rectangular sleeve housing having a top surface and a bottom surface and a front surface and a bottom surface and two opposing open ends, and comprising an overlying semi-opaque housing indicia, according to one preferred embodiment of the present invention.
Figure 2:
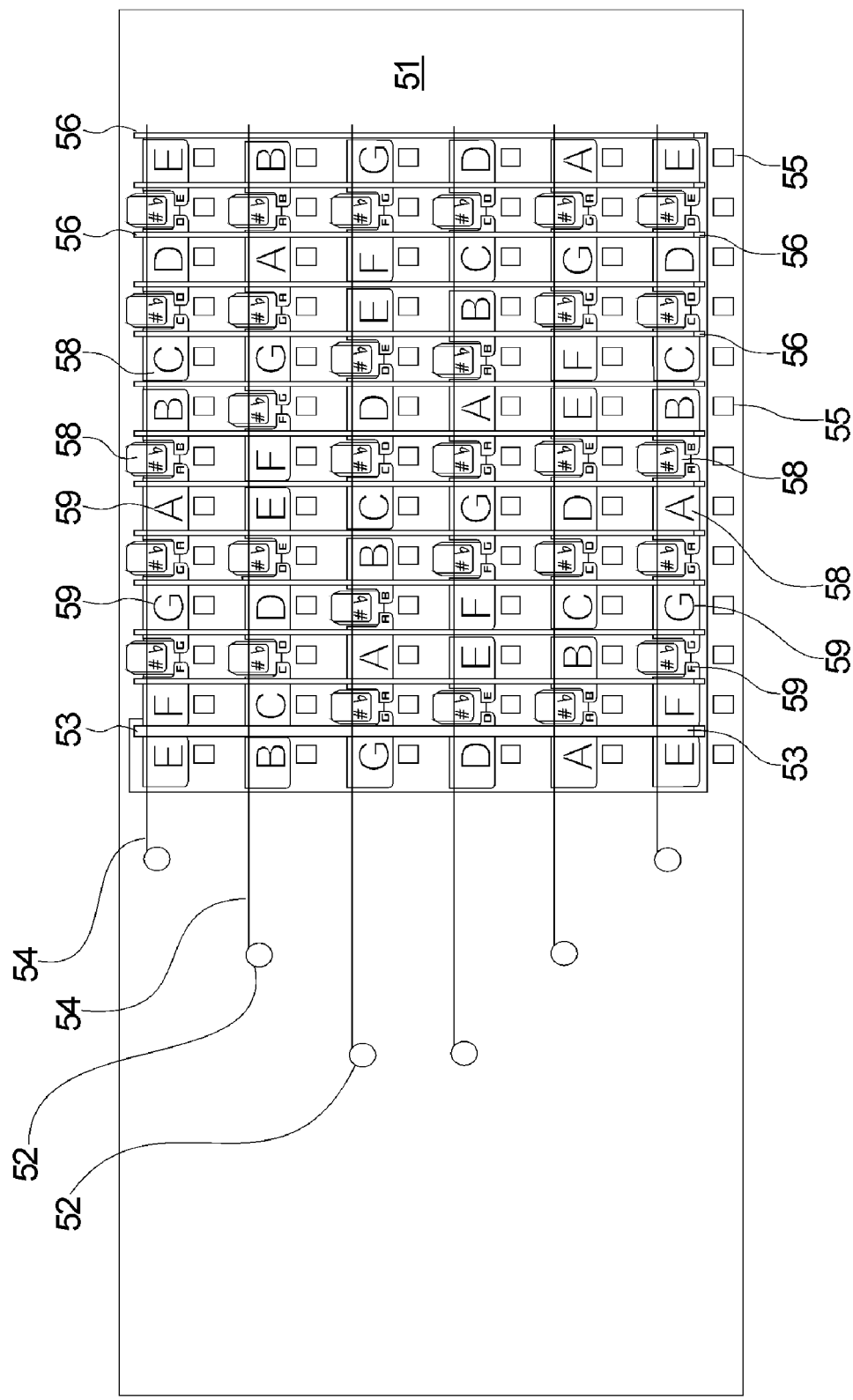
FIG. 2: is a plan view of the slidable combo-instrument tuning card (standard E instrument tuning), comprising underlying opaque first music indicia, according to one preferred embodiment of the present invention.
Figure 3:
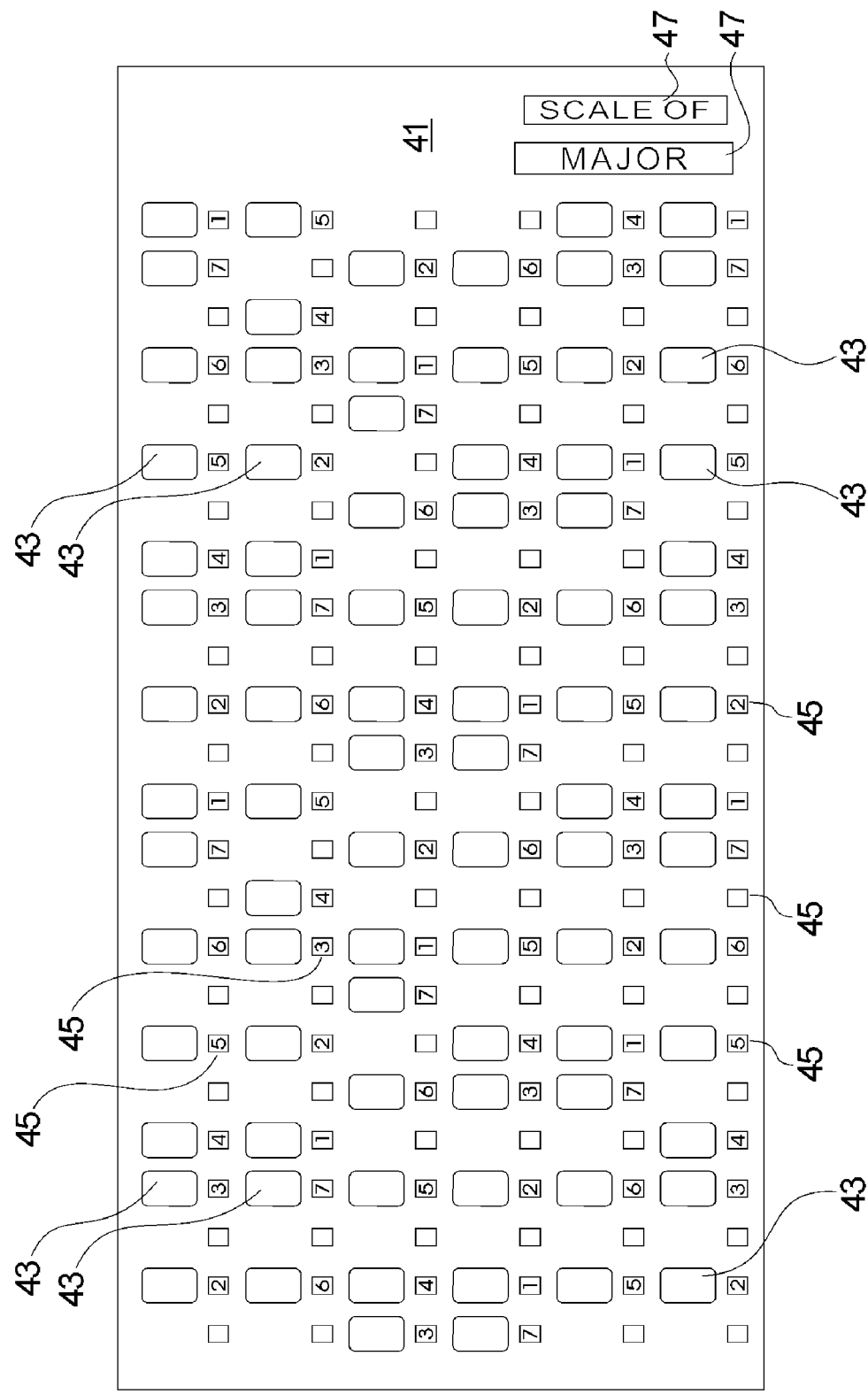
FIG. 3: is a plan view of a scale or mode insert, comprising overlying and underlying semi-opaque second music indicia relative to musical reference values for the major scale in (standard E instrument tuning).
Figure 4:
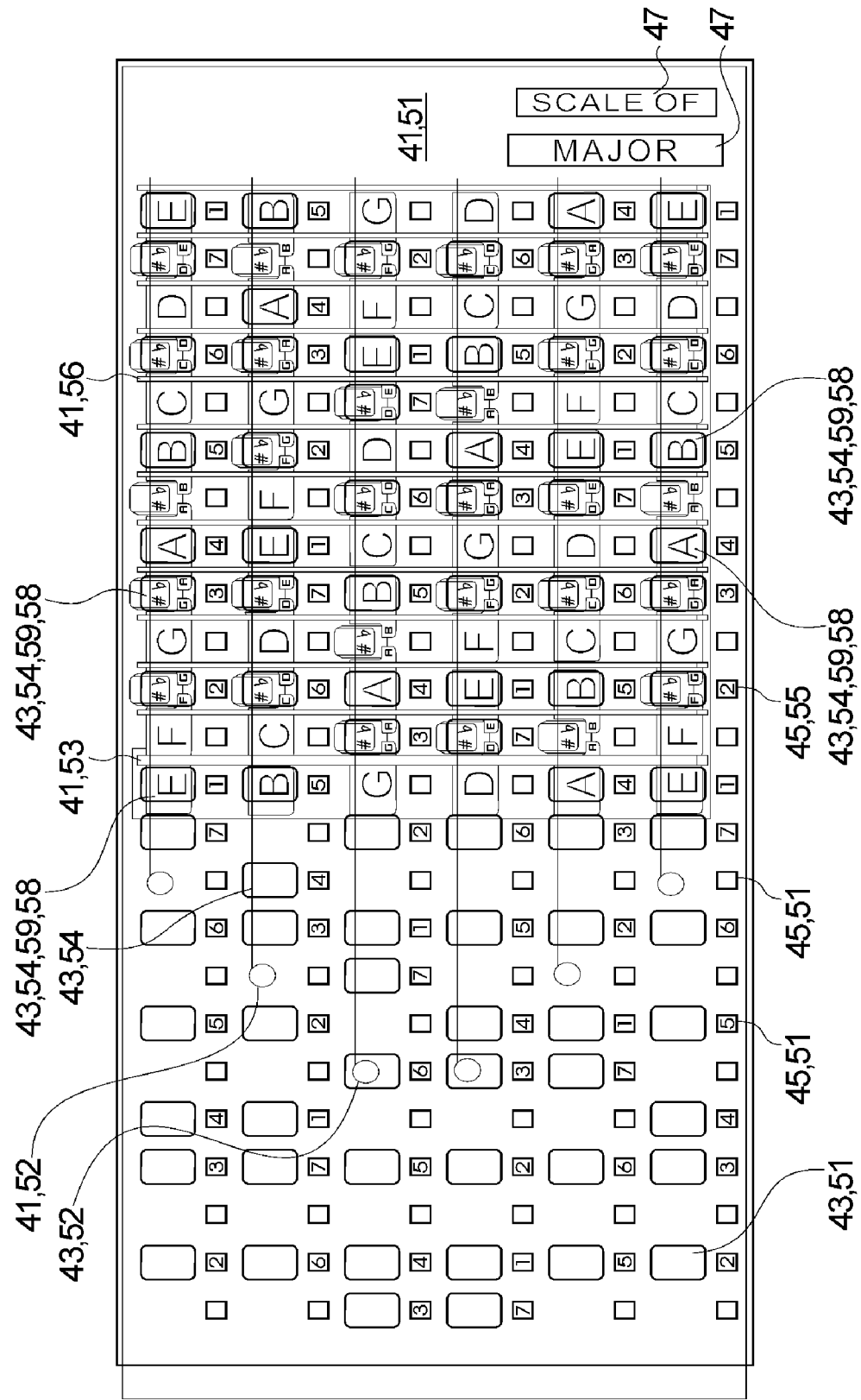
FIG. 4: is an embodiment of said major scale insert of FIG. 3 overlying said slidable combo-instrument tuning card of FIG. 2 at a starting position, while storing remaining said scale or mode inserts underneath said slidable combo-instrument tuning card of FIG. 2.
Figure 5:
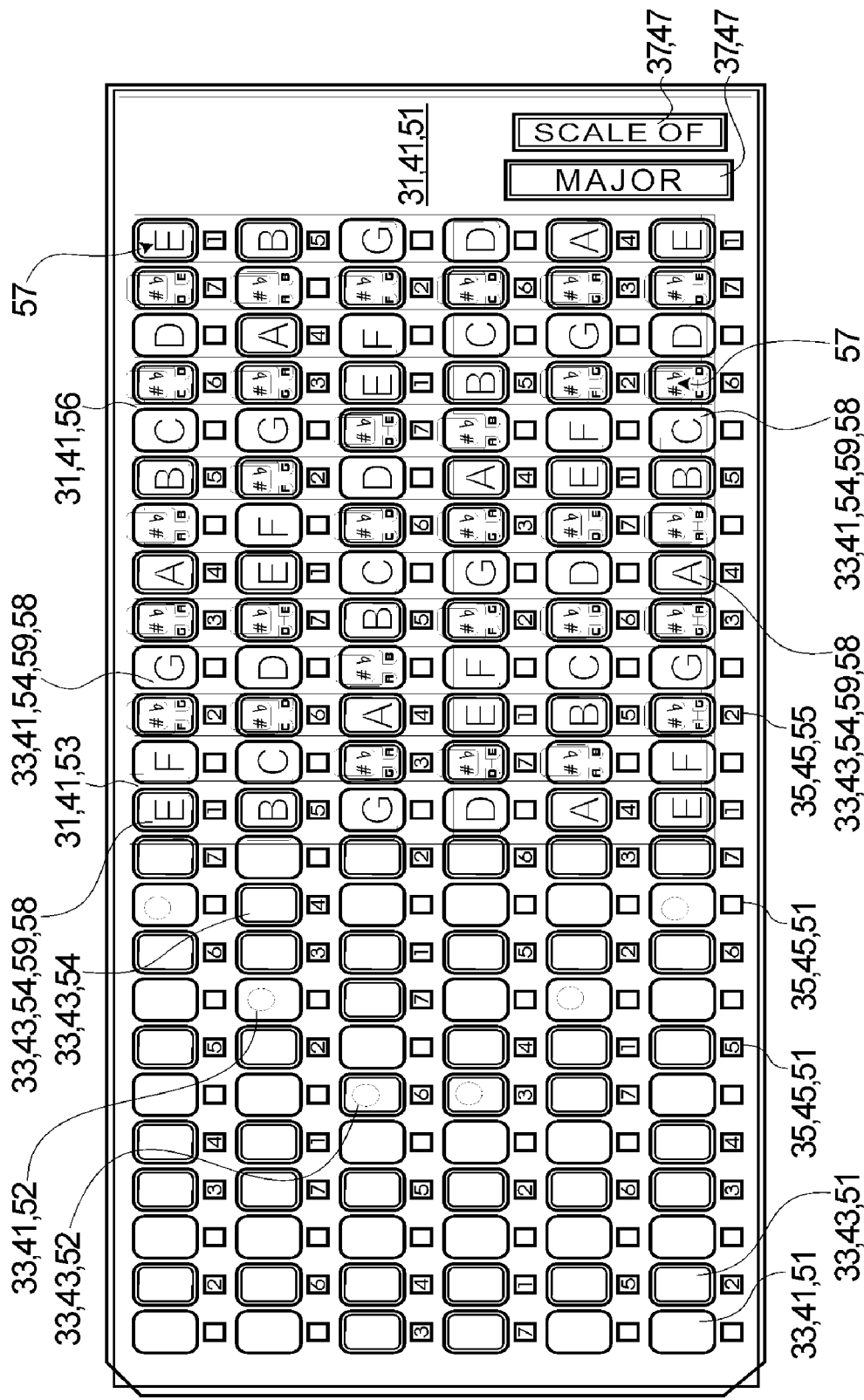
FIG. 5: is an embodiment of said embodiment FIG. 4 inserted into said open end of rectangular sleeve housing of FIG. 1 at a starting home position and key of (E Major).
Figure 6:
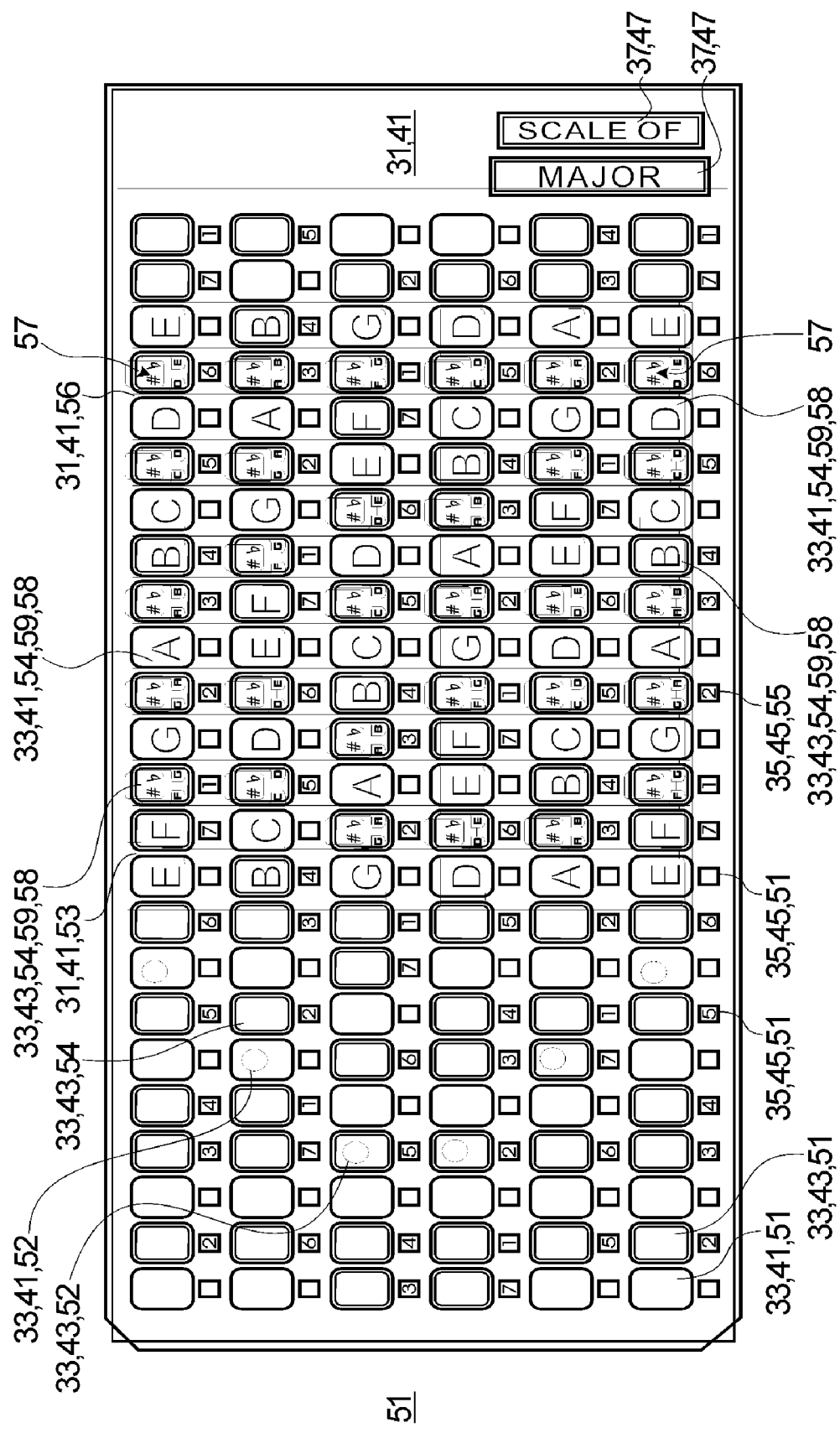
FIG. 6: is an embodiment of said embodiment FIG. 5 having said slidable combo-instrument tuning card slid to the position and key of (F sharp/G flat).
Figure 7:
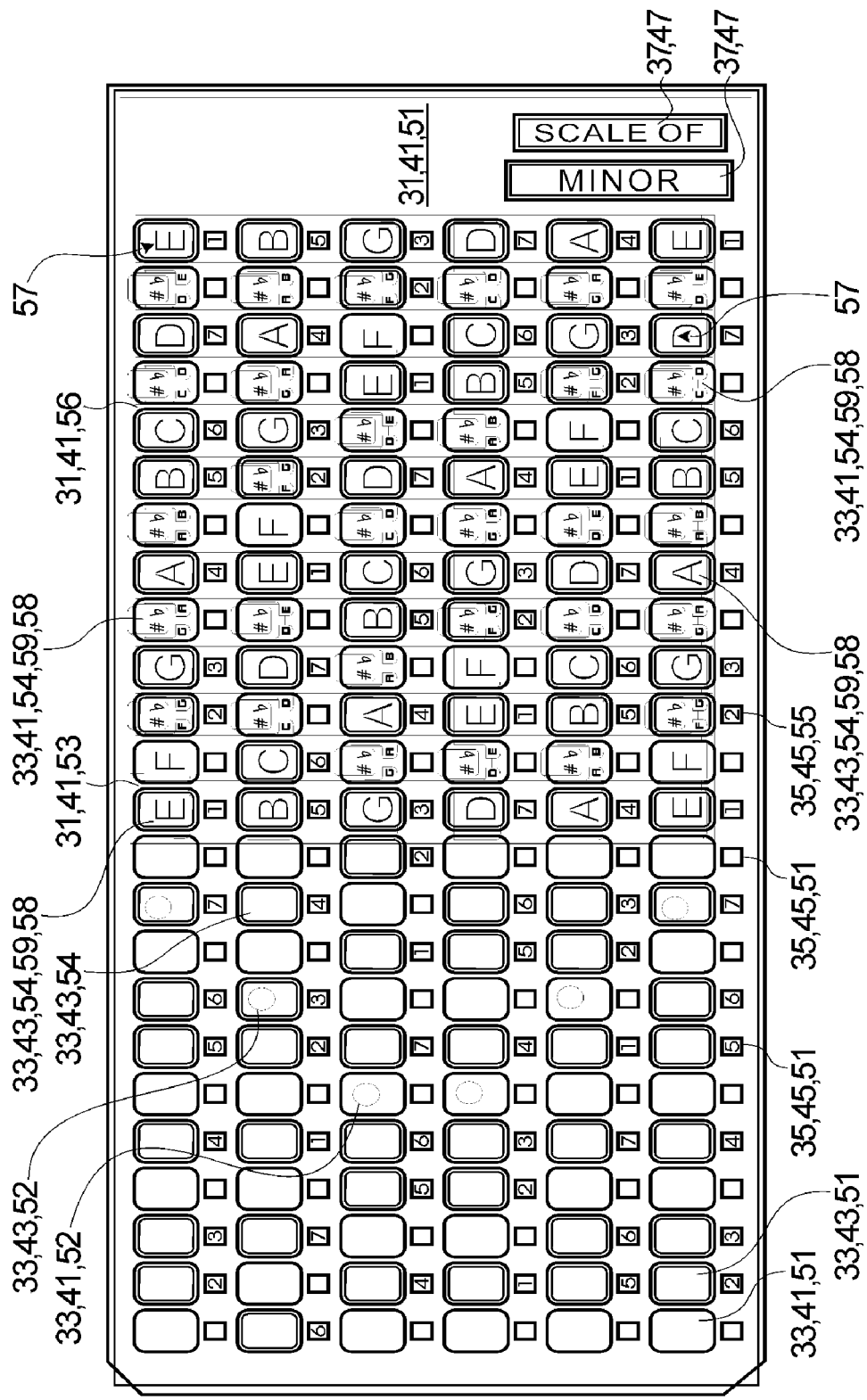
FIG. 7: is an embodiment of said embodiment FIG. 5 having said major scale insert replaced with a minor scale insert at a position and key of (E Minor).
Figure 8:
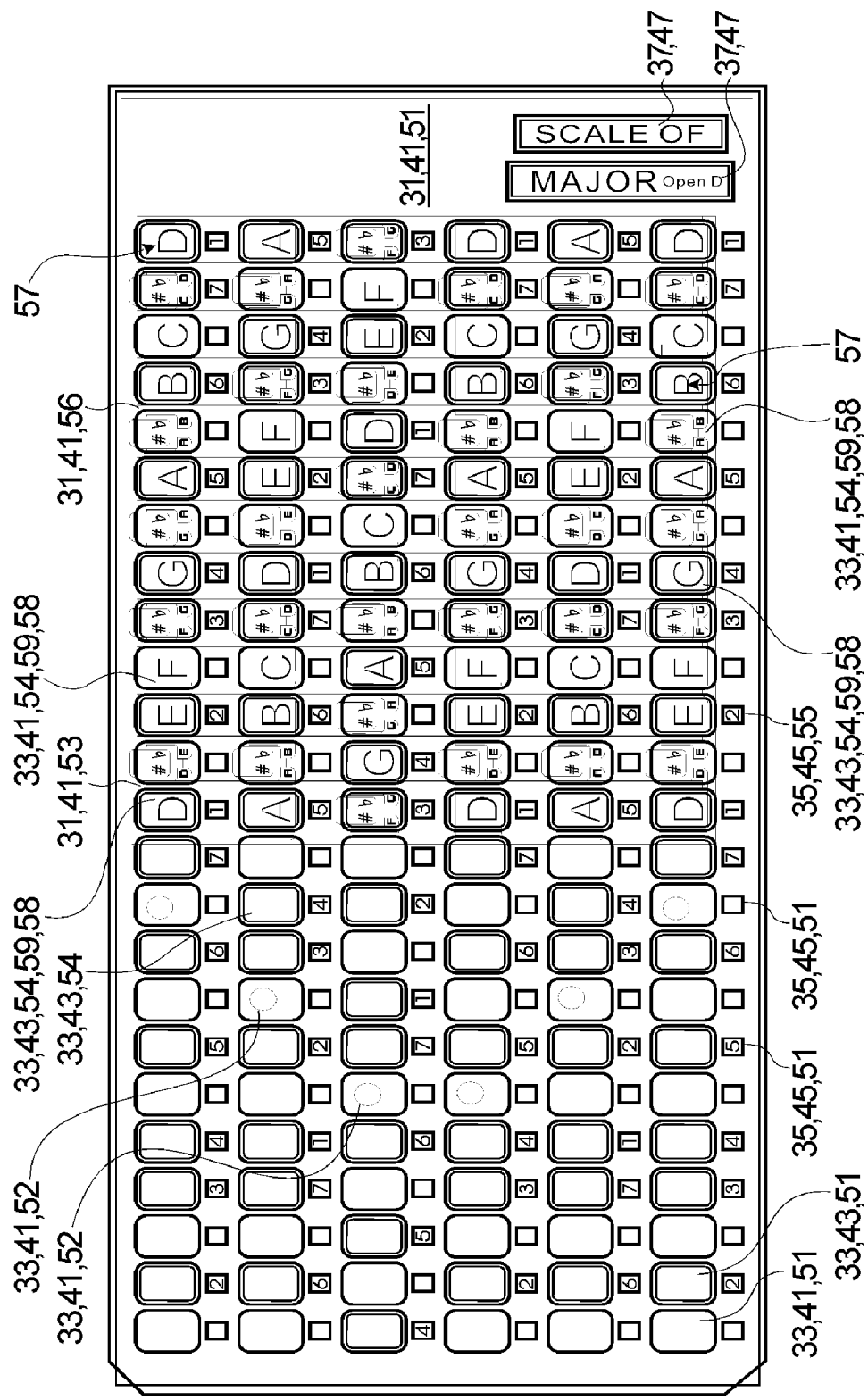
FIG. 8: is an embodiment of FIG. 5 having said slidable combo-instrument tuning card (standard E tuning) and relative major scale insert replaced with slidable combo-instrument tuning card (Open D tuning) and its relative major scale insert.
Figure 9:
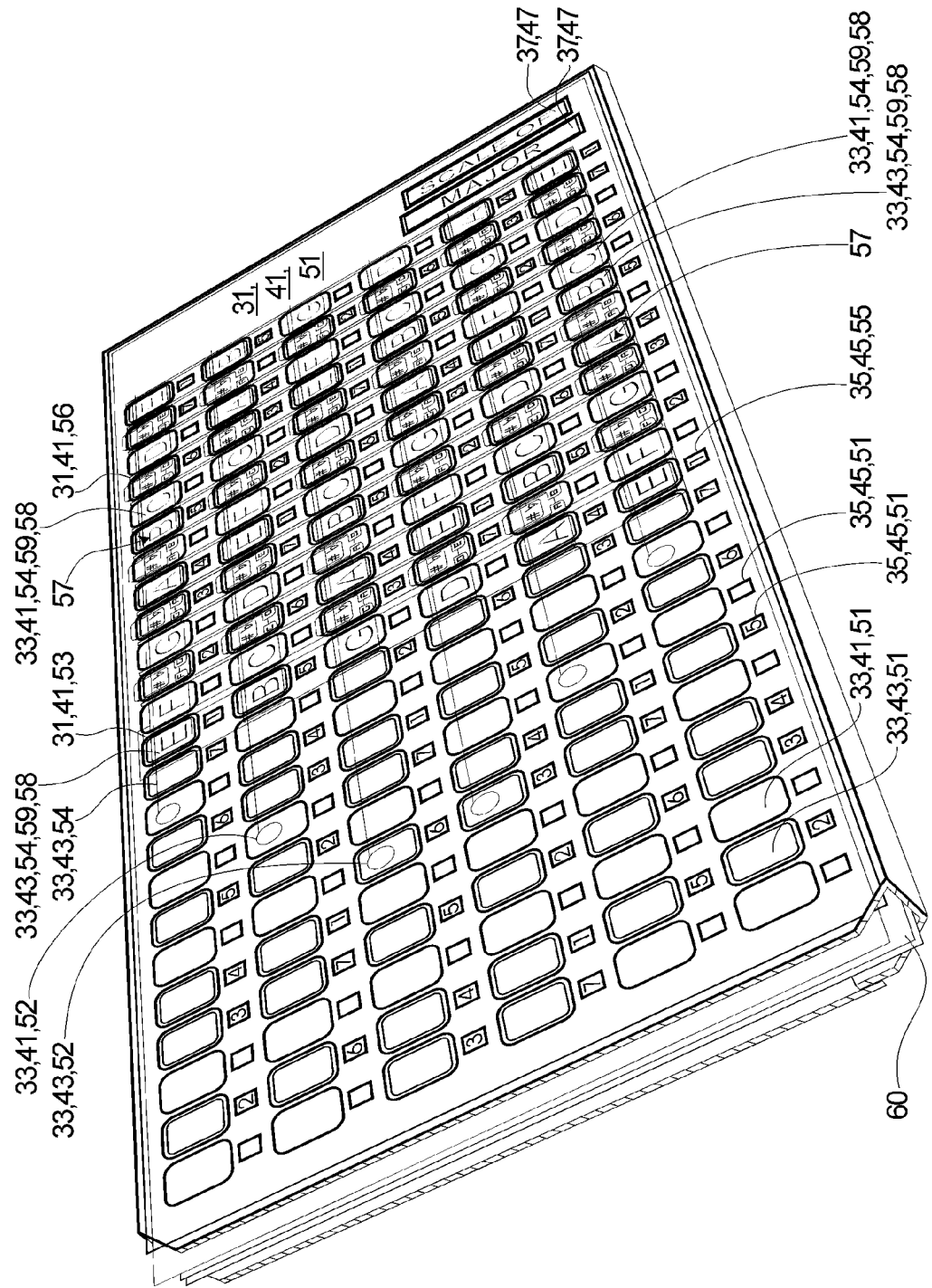
FIG. 9: is a perspective view of embodiment FIG. 4.
Figure 11:
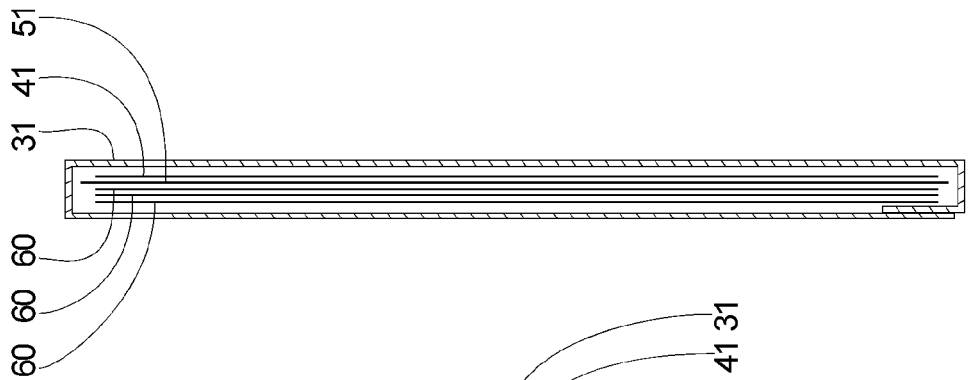
FIG. 11: is a side view of embodiment FIG. 4.
Figure 10:
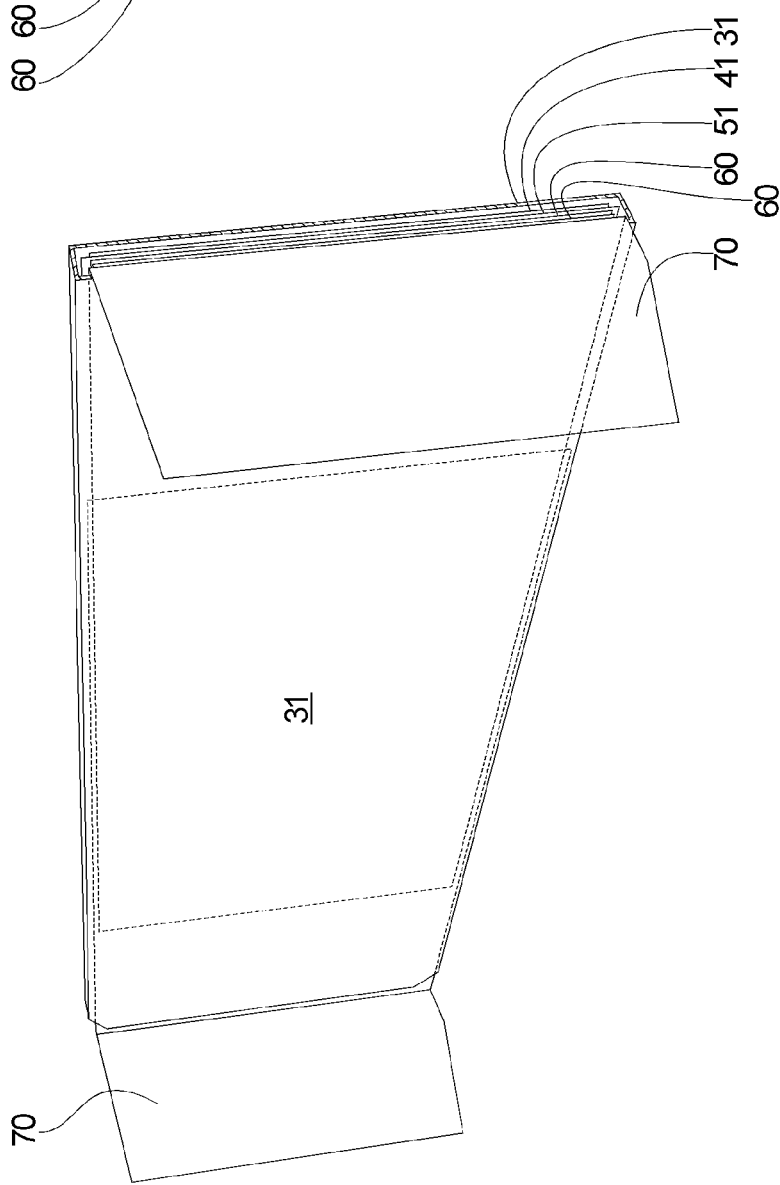
FIG. 10: is a perspective view of embodiment FIG. 4 having slidable stand members slid out and folded back acting as a stand.

An algorithmic combo-instrument slide ruler for musical reference comprising three main parts, one common part and two interchangeable parts acting as variables. First, a variable slidable combo-instrument tuning card (FIG. 2) preferably made of recycled paper is selected from a multitude of slidable combo-instrument tuning cards. Said slidable combo instrument tuning card 51 is opaque having 3 dimensional first music indicia printed thereon that of a stringed instrument, a keyboard instrument, and white backdrops for dependant finger position data boxes 55. Said stringed Instrument comprises tuning mechanisms 52, a nut 53, strings 54, frets 56, and fingering positions 57. Said piano keyboard comprises piano keys 58 inlaid according to shared note 59 and octave values into appropriate fingering positions of said stringed Instrument according to selected instrument tuning. Said piano keys are displayed in a multi-tier fashion to aid the user in determining octave breaks, and for ease of multi instrument cross referencing, and have appropriate musical note letter values printed thereon. Secondly, a common rectangular sleeve housing (FIG. 1) preferably made of thin recycled transparent plastic. Said rectangular sleeve housing has a top surface, a bottom surface, a front surface, a back surface, and two opposing open ends. Said rectangular housing 31 has housing indicia printed thereon providing for a limited view of underlying indicia with the exception of Parent windows 33 and dependant child windows 35, arranged in a reticulated manner and a scale or mode name window 37, all being left completely transparent provided for a clear view of selected underlying indicia there through. Thirdly a variable, a multitude of tuning dependant scale and mode inserts 41 preferably made of thin recycled transparent plastics. Said multitude of scale and mode inserts have second music indicia printed thereon providing for a limited view of underlying indicia each with their own predetermined array of transparent finger position windows 43, dependant finger position data boxes 45, and a scale or mode name box 47. An example of one such scale insert (FIG. 3) is provided in this disclosure. A scale or mode insert is selected and placed in front of a relative slidable combo-instrument tuning card, while the remaining scale and mode inserts and tuning cards are replaced behind it becoming stored multitude of cards and inserts 60. The entire stack is then slid through an opening at the left side of the rectangular sleeve housing until becoming flush with the opening at its right side leaving only the oversized slidable combo-instrument tuning card protruding from sleeve housings left side (FIG. 9). The selected scale or mode insert is unique having its own predetermined array of finger position windows and dependant finger position data boxes that align and remain stationary with parent windows and dependant child windows that are arranged in a reticulated manner on the front of the sleeve housing. Said Sleeve housing parent windows having an adjacent finger position window are open and allow slidable combo-instrument tuning card to be visible there through while displaying dependant finger position data boxes in parents' dependant child window. Said Sleeve housing parent windows not having an adjacent finger position window become closed and allow for a limited view of the slidable combo-instrument tuning card there through the semi-opaque scale or mode insert while displaying a blank dependant finger position data box in dependant child window. Said Sleeve housing parent windows with adjacent finger position windows provide available fingering patterns for selected scale or mode, while displaying scale increment intervals and reverse intervals by means of numbers, and natural and artificial chords by means of color coding and numbers in relevant dependant child windows. Sliding slidable combo-instrument tuning card left to the next available alignment raises the key of the scale or mode to the next available note allowing for transposing. The algorithmic combo-instrument slide ruler in its first embodiment comprises of one sleeve housing, two slidable stand members 70, twenty eight scale insert types, two slidable combo-instrument tuning cards, and will be able to be upgraded to over a hundred scale insert types for each of the twenty possible instrument alternate tunings to cover all music styles and cultures.

What is claimed is:

1. An algorithmic combo-instrument slide ruler for musical reference, comprising:

a) a multitude of slidable combo-instrument tuning cards of thin opaque sheet materials having each a front side and a back side, said opaque sheet materials having first music indicia that of a string instrument, and a keyboard instrument, or a combination string and keyboard instrument disposed visible on at least one of said front or back sides; and b) a multitude of scale and mode inserts of thin transparent sheet materials having each a front side and a back side, said front sides having each their own unique color display of predetermined semi-opaque second music indicia relative to its musical scale or mode having;
  (1) an array of finger position windows allowing for some of said first music indicia to be visible there through; and
  (2) dependant finger position data boxes some of which indicating scale, interval, and chord information printed thereon; and
  (3) a scale or mode name box providing the name of the resident scale or mode type and instrument tuning; and c) a rectangular sleeve housing of thin transparent material having a top surface and a bottom surface and a front surface and a back surface and two opposing open ends, said housing including,
  (1) semi-opaque housing indicia visible on said top surface, bottom surface, front surface, and back surface providing for a limited view of underlying layers; along with
  (2) a group of paired parent windows and dependant child windows arranged in a reticulated manner, with atleast some of both first music indicia and second music indicia visible there through the said parent window, and said dependant finger position data boxes visible there through the dependant child windows; and
  (3) a scale or mode name window allowing there through said scale or mode name box to be visible;

d) one scale or mode insert is selected from said multitude of scale and mode inserts and placed in front of one relative selected said slidable combo-instrument tuning card becoming the active scale or mode insert, and the remainder of said multitude of scale and mode inserts are placed behind said combo-instrument tuning card becoming stored multitude of scale and mode inserts; and then said stored multitude of scale and mode inserts, said slidable combo-instrument tuning card, and said active scale or mode insert are disposed together between said front and back surfaces of the said rectangular sleeve housing allowing said slidable combo-instrument tuning card to extend beyond the left side of said stored multitude of scale and mode inserts, said active scale or mode insert, and said open end of said housing for moving the slidable combo-instrument tuning card to a desired position relative to said finger position windows and said parent windows for displaying there through said parent windows disclosed first music indicia and said finger position windows while displaying undisclosed first music indicia through said semi-opaque second music indicia, and for displaying said dependant finger position data boxes there through said dependant child windows providing substantially all music information related to said active scale or mode insert to include natural and artificial chords, scales, intervals, inversions of intervals, transpositions, while defining spaced octaves on a multi-instrument cross referencing level.

2. The algorithmic combo-instrument slide ruler as in claim 1 wherein said slidable combo-instrument tuning cards first music indicia printed thereon comprises a three-dimensional representation that of a stringed instrument having tuning mechanisms, a nut, strings, frets, and fingering positions; along with a three dimensional representation that of piano keys, both white and black, arranged and shaded accordingly in a multi-tier fashion defining spaced octaves and having its musical note letter values placed thereon according to the appropriate guitar fingering value equivalents that of a stringed instrument allowing for ease of multi-instrument reference.

3. The algorithmic combo-instrument slide ruler as in claim 1 wherein some of said finger position dependant scale data boxes contain numbers indicating scale, interval, and chord information printed thereon.

4. The algorithmic combo-instrument slide ruler as in claim 1 wherein slidable stand members are slidable to a position and folded back acting as a stand for said algorithmic combo instrument slide ruler.

5. An algorithmic combo-instrument slide ruler for musical reference, comprising:
   a) a multitude of slidable combo-instrument tuning cards of thin opaque sheet materials having each a front side and a back side, said opaque sheet materials having first music indicia that of a combination string and keyboard instrument disposed visible on atleast one of said front or back sides; and
   b) a multitude of scale and mode inserts of thin transparent sheet materials having each a front side and a back side, said front sides having each their own unique color display of predetermined semi-opaque second music indicia relative to its musical scale or mode having;
      (1) an array of finger position windows allowing for some of said first music indicia to be visible there through; and
      (2) dependant finger position data boxes some of which indicating scale, interval, and chord information printed thereon; and
      (3) a scale or mode name box providing the name of the resident scale or mode type and instrument tuning; and
   c) a rectangular sleeve housing of thin transparent material having a top surface and a bottom surface and a front surface and a back surface and two opposing open ends, said housing including,
      (1) semi-opaque housing indicia visible on said top surface, bottom surface, front surface, and back surface providing for a limited view of underlying layers; along with
      (2) a group of paired parent windows and dependant child windows arranged in a reticulated manner, with atleast some of both first music indicia and second music indicia visible there through the said parent window, and said dependant finger position data boxes visible there through the dependant child windows; and
      (3) a scale or mode name window allowing there through said scale or mode name box to be visible;
   d) one scale or mode insert is selected from said multitude of scale and mode inserts and placed in front of one relative selected said slidable combo-instrument tuning card becoming the active scale or mode insert, and the remainder of said multitude of scale and mode inserts are placed behind said combo-instrument tuning card becoming stored multitude of scale and mode inserts; and then said stored multitude of scale and mode inserts, said slidable combo-instrument tuning card, and said active scale or mode insert are disposed together between said front and back surfaces of the said rectangular sleeve housing allowing said slidable combo-instrument tuning card to extend beyond the left side of said stored multitude of scale and mode inserts, said active scale or mode insert, and said open end of said housing for moving the slidable combo-instrument tuning card to a desired position relative to said finger position windows and said parent windows for displaying there through said parent windows disclosed first music indicia and said finger position windows while displaying undisclosed first music indicia through said semi-opaque second music indicia, and for displaying said dependant finger position data boxes there through said dependant child windows providing substantially all music information related to said active scale or mode insert to include natural and artificial chords, scales, intervals, inversions of intervals, transpositions, while defining spaced octaves on a multi-instrument cross referencing level.

6. The algorithmic combo-instrument slide ruler as in claim 5 wherein said slidable combo-instrument tuning cards first music indicia printed thereon comprises a three-dimensional representation that of a stringed instrument having tuning mechanisms, a nut, strings, frets, and fingering positions; along with a three dimensional representation that of piano keys, both white and black, arranged and shaded accordingly in a multi-tier fashion defining spaced octaves and having its musical note letter values placed thereon according to the appropriate guitar fingering value equivalents that of a stringed instrument allowing for ease of multi-instrument reference.

7. The algorithmic combo-instrument slide ruler as in claim 5 wherein some of said finger position dependant scale data boxes contain numbers indicating scale, interval, and chord information printed thereon.

8. The algorithmic combo-instrument slide ruler as in claim 5 wherein slidable stand members are slidable to a position and folded back acting as a stand for said algorithmic combo instrument slide ruler.

* * * * *